March 26, 1974  H. J. BARTNICK  3,799,778
FILM UNIT DIVERTER BAR WITH COLLAPSIBLE SPACER MEANS
Filed July 5, 1972  4 Sheets-Sheet 2
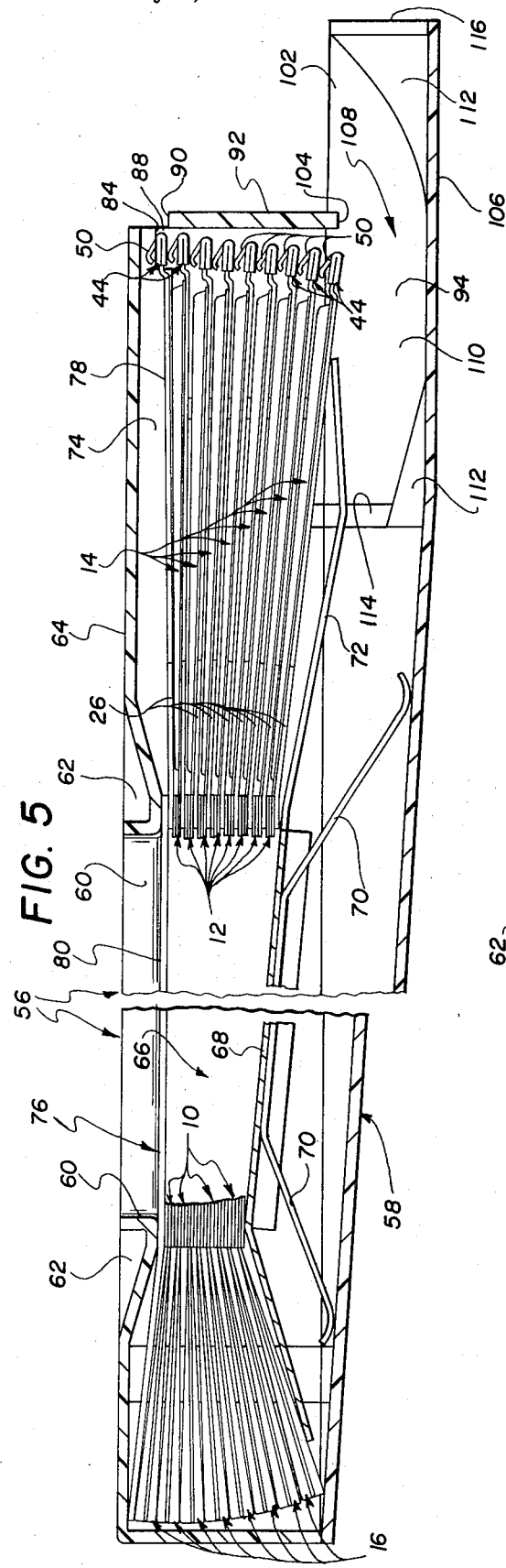
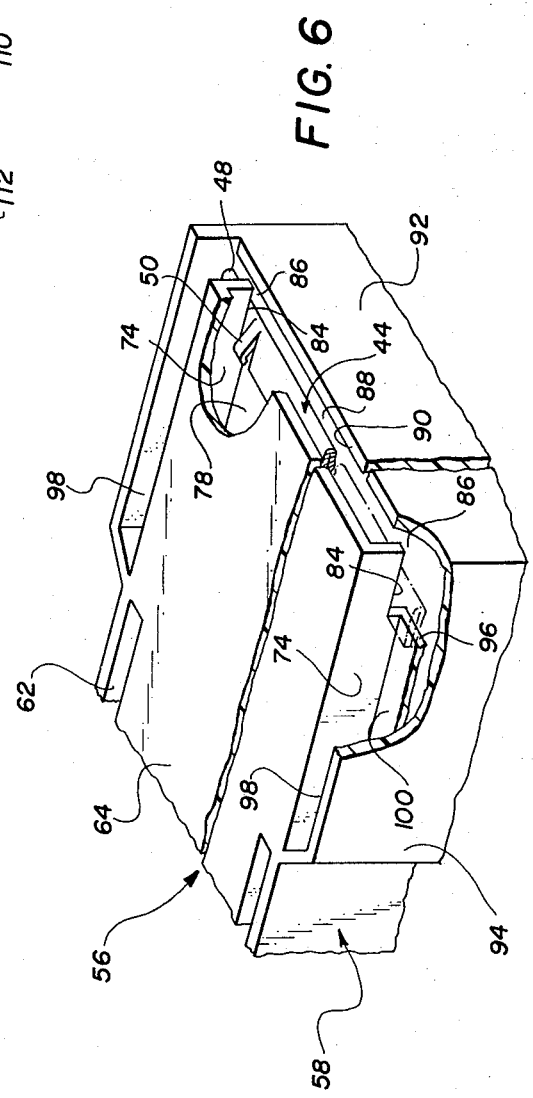

March 26, 1974    H. J. BARTNICK    3,799,778

FILM UNIT DIVERTER BAR WITH COLLAPSIBLE SPACER MEANS

Filed July 5, 1972      4 Sheets-Sheet 3

United States Patent Office 3,799,778
Patented Mar. 26, 1974

3,799,778
FILM UNIT DIVERTER BAR WITH COLLAPSIBLE SPACER MEANS
Henry J. Bartnick, Brockport, N.Y., assignor to Eastman Kodak Company, Rochester, N.Y.
Filed July 5, 1972, Ser. No. 268,974
Int. Cl. G03c 1/48
U.S. Cl. 96—76 C
10 Claims

ABSTRACT OF THE DISCLOSURE

A stiffening diverter bar attached to a separable pod assembly of a self-processable film unit is provided with collapsible spacer means that increase the effective thickness of the bar to improve the spacing and manipulability of a plurality of such film units supplied in a cartridge for sequential exposure and processing. The processing is initiated by advancing the exposed film unit through a nip defined by a pair of juxtaposed pressure members, which collapse the spacer means and thereby reduce the effective thickness of the bar so that the spacer means do not interfere with the remainder of the processing operation or with efficient separation and storage of the exhausted pod assembly.

CROSS-REFERENCE TO RELATED APPLICATIONS

Reference is made to the following commonly assigned, copending U.S. patent applications, all filed concurrently with this application:

Ser. No. 268,948, entitled Film Unit Processing Mechanism, filed in the names of Henry S. Adamski and Guilford E. Kindig; and Ser. No. 268,932 entitled Photographic Film Unit, Ser. No. 268,940 entitled Film Handling Improvement, and Ser. No. 268,930 entitled Print Separating Device for Processing Camera, all filed in the name of Donald M. Harvey.

BACKGROUND OF THE INVENTION

The present invention relates generally to self-processable film units of the type comprising a photosensitive image-recording section or print card separably attached to a processing section or pod assembly, and particularly to a stiffening diverter bar attached to the pod assembly to facilitate manipulation of the film unit during processing.

The typ of film unit to which the present invention relates comprises a photosensitive image-recording section or print card, including a pair of superposed sheets, separately joined at one end to a processing section or pod assembly, including a rupturable pod of processing fluid and a transversely mounted, stiffening diverter bar that defines the leading end of the film unit. A plurality of such film units may be supplied in a cartridge as a film pack for use in a camera adapted to expose and initiate processing of each unit. After the print card of each film unit so used has been exposed, the unit is moved endwise by a camera mechanism out of the cartridge and into a nip defined by a pair of juxtaposed pressure members in the camera, at least one of which is then rotated to drive the unit through the nip. Beyond the nip, the diverter bar is engaged by guide means that direct the bar and the pod partially around one of the pressure members and into a storage compartment in the cartridge. As the pod passes through the nip, hydraulic pressure developed in the pod ruptures a sealed area thereof and delivers the processing fluid between the two superposed sheets of the print card. As the print card emerges from the nip, its inherent stiffness causes it to move endwise in a substantially straight path toward the camera exterior rather than follow the pod assembly around the one pressure member. The print card thus pulls free of the pod assembly, and continued movement of the card through the nip effects distribution of the processing fluid across the exposed image area of the card and passage of any excess fluid into a fluid-receiving trap at the trailing end of the film unit. Each successively exposed film unit of the pack is processed in the same manner, and the successively separated pod assemblies are delivered to the storage compartment in stacked relation to one another. Accordingly, after all of the available film units have been exposed and processed, the cartridge can be removed from the camera and discarded along with the stored pod assemblies, thereby eliminating any need for the photographer to handle the exhausted pods.

Within the cartridge or film pack, the film units initially lie substantially flat in stacked relation to one another behind an exposure opening or window in the front wall of the film pack casing. Resilient spring means urge the entire stack of film units forwardly to seat the forwardmost print card against the casing front wall, thereby establishing its exposure position and to seat the forwardmost diverter bar against positioning surfaces that establish its alignment with an exit slot in an end wall of the film pack casing. A reciprocable feeder member in the camera is provided with a pair of fingers that enter the film pack and engage the lateral end portions or tips of the forwardmost diverter bar to move that bar, and with it the remainder of the forwardmost film unit, through the exit slot and into the nip after the film unit has been exposed. The feeder member fingers, the positioning surfaces, and the exit slot are adapted to permit the forwardmost diverter bar to emerge from the film pack casing without permitting endwise movement of the next succeeding film unit. During each operating cycle, the feeder member is reciprocated from an initial or first position to a retracted or second position and then back to its initial position, to feed a single film unit into the nip and restore the mechanism to its initial condition for subsequent initiation of the next operating cycle. This arrangement for feeding successive film units from a film pack into a pressure member nip is disclosed in the above cross-referenced U.S. patent application Ser. No. 268,948, incorporated herein by reference.

To achieve maximum compactness of each pod assembly in its stored condition after removal from the print card, it is desirable to make the diverter bar as thin as possible. However, making the diverter bar thicker is advantageous in providing adequate spacing between successive pod assemblies prior to processing, and in reducing the tolerances that would otherwise be required of the feeder member fingers and certain film pack elements, to ensure removal of only the forwardmost film unit from the film pack during each processing cycle. In other words, if the diverter bar were made quite thick, relatively crude means would suffice to ensure proper feeding of the forwardmost film unit from the film pack, but such a bar would reduce the compactness of the removed pod assemblies in their stored condition, and would also enlarge and complicate the guide means by which the diverter bar is manipulated to direct the pod assembly into the storage compartment.

SUMMARY OF THE INVENTION

The principal objects of the present invention are to improve the feedability of film units of the type described above and to improve the manipulability and storability of their pod assemblies in cooperating photographic apparatus.

These and other objects are accomplished in accordance with the present invention by means of an improved stiffening member or diverter bar that is provided with novel spacer means which increase the effective initial thickness of the bar, to improve the feedability of the film unit from its pack to a pressure member nip in the camera, but which are collapsible when the bar passes through the nip, to decrease the effective subsequent thickness of the bar and thereby improve the manipulability and storability of the film unit pod assembly after the bar emerges from the nip.

Various means for practicing the invention and other advantages and features thereof will be apparent from the detailed description of the preferred embodiment of the invention presented below.

BRIEF DESCRIPTION OF THE DRAWINGS

In the detailed description of the preferred embodiment of the invention presented below, reference is made to the accompanying drawings wherein like reference numerals denote like elements and wherein:

FIG. 5 is an enlarged cross-sectional view of the film pack shown in FIG. 4, taken along line 5—5 of FIG. 4, with a central section thereof removed to illustrate the film units and other internal elements of the pack;

FIG. 6 is a partial perspective view of the film pack shown in FIGS. 4 and 5, with portions thereof removed to illustrate feeding, gating, and locating structures in a section of the film pack casing adjacent to its exit opening;

DESCRIPTION OF THE PREFERRED EMBODIMENT

Because photographic cameras and film units of the selfprocessable type are well known, the following description is directed in particular to elements forming part of, or cooperating directly with, the present invention, elements not specifically shown or described herein being selectable from those known in the art.

Figure 1:
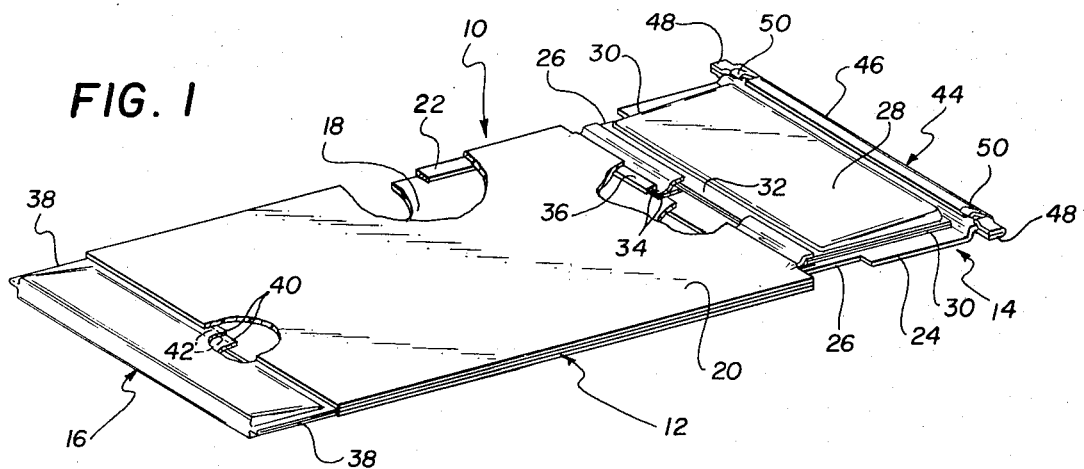
FIG. 1 is a perspective view of a self-processable film unit constructed in accordance with the preferred embodiment of the present invention, with portions thereof broken away to illustrate its various components.
Figure 2:
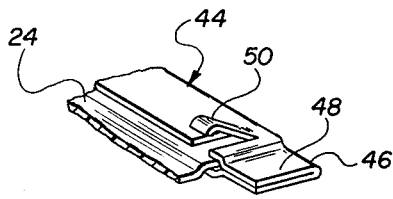
FIG. 2 is an enlarged perspective view of a portion of the film unit stiffening diverter bar, showing the spacer means of the present invention in its initial or projecting condition.
Figure 4:
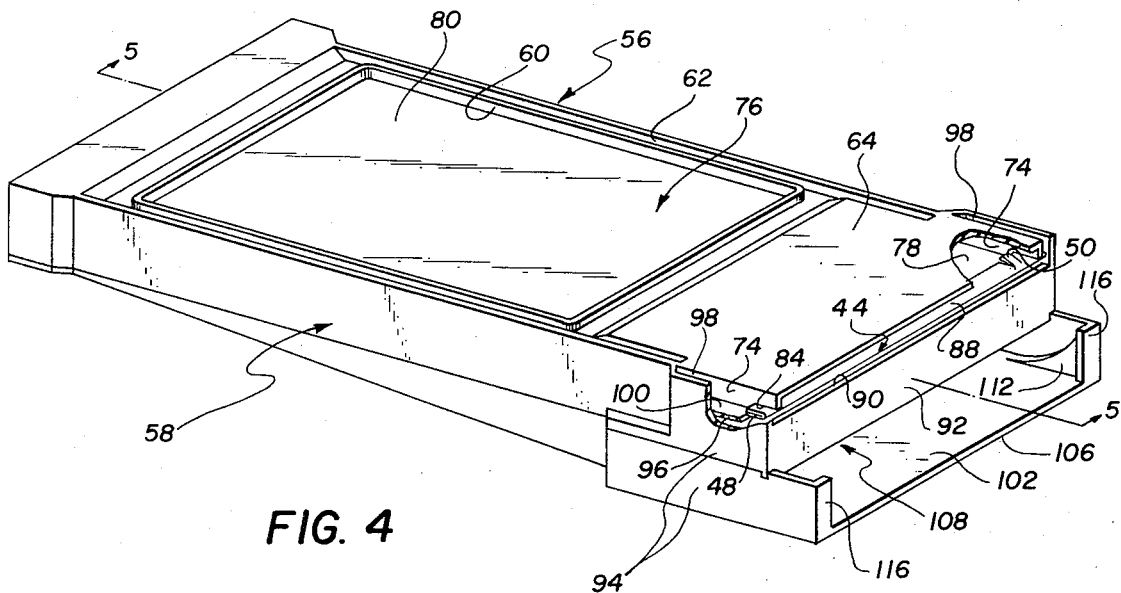
FIG. 4 is a perspective view of a film cartridge or pack including a plurality of film units of the type shown in FIG. 1, with portions of the film pack casing broken away to illustrate film unit locating and feeding elements thereof.

A self-processable film unit of the general type with which the present invention is concerned is shown in FIG. 1, and a film cartridge or pack including an assemblage or stack of such film units is illustrated in FIGS. 4–6. Because details of such film units and film packs are described in the above-cross-referenced U.S. patent application Ser. No. 268,932, incorporated herein by reference, such details not essential to an understanding of the present invention have been omitted from this disclosure.

Briefly, the film unit 10, illustrated in FIG. 1, includes an image-recording section or print card 12 generally defining a plane, a processing section or fluid pod assembly 14, and a trap assembly 16. The print card 12 comprises a photosensitive sheet 18 and a transparent cover or process sheet 20, which is permanently attached to the photosensitive sheet along its lateral edges by being permanently bonded to thin lateral spacer rails 22. The photosensitive sheet and the process sheet thus are maintained permanently in superposed or registered relation to each other so that their central or image areas between rails 22 are maintained in alignment but may be spread apart sufficiently to permit distribution of a processing composition therebetween. The image-recording section or print card is exposed through its transparent process sheet 20 and, after processing, is viewed from the opposite side to provide a right-reading image without recourse to image-reversing mirrors or the like in the camera. The processing fluid introduced between the two sheets is opaque and thereby prevents further exposure of the photosensitive sheet from occurring while the film unit is removed from the camera but before the processing fluid has had time to complete its processing function.

The processing section or fluid pod assembly 14 includes a resiliently flexible carrier sheet 24 that is substantially the same width as the image-recording section or print card 12 but is laterally notched at its trailing end to provide a carrier sheet tongue 26 that is separably attached to the print card by a rupturable adhesive material or the like. Between the leading edge of the carrier sheet and the leading edge of the print card, a processing fluid pod 28 is permanently attached to the carrier sheet. The processing fluid pod may include various cooperating parts which together define a suitable processing composition supplying means. Preferably, the pod comprises a rectangular piece of vapor-impervious material that is folded transversely and then sealed along its lateral edges 30. A rupturable seal or joint is provided along its trailing edge 32, which initially is disposed adjacent to the leading edge of the print card. A pair of funnel sheets 34 are permanently attached to trailing edge 32 and are received between the leading edge of photosensitive sheet 18 and a spacer strip 36 attached to the leading edge of process sheet 20. During the processing operation, the film unit is transported endwise, leading end first, through a pressure nip defined by a pair of pressure-applying members, as described below. The resulting hydraulic pressure developed within the pod ruptures the seal adjacent to the funnel sheets and causes the processing composition to flow from the pod, between the funnel sheets, and into the print card. Because the funnel sheets are not positively joined to the print card, they can thereafter be withdrawn readily from between sheet 18 and strip 36.

At the trailing end of the film unit, the trap assembly 16 comprises a sheet of moisture-impervious material that is folded transversely and then sealed along its lateral edges 38 to define an internal storage chamber, which is prevented from collapsing by an internal plastic support member, not shown. A pair of lips 40 defined by the leading edges of the folded trap sheet extend between the trailing edges of the photosensitive and process sheets, and are permanently bonded thereto. The confronting surfaces of lips 40 initially are unattached to each other so that excess processing fluid extruded from the trailing edge of the print card will enter the trap between those lips and be received in the internal storage chamber. The confronting lip surfaces, and also the confronting surfaces of spacer strip 36 and photosensitive sheet 18, can be coated with an adhesive that is activated by the processing fluid to bond those surfaces together after the processing operation has been completed, leaving the ends of the finished photograph peramnently sealed. A scored or otherwise weakened separation line 42 can be provided along each lip portion of the trap to facilitate removal of the trap from the finished photograph. If this feature is provided, the corresponding sealing material activated by the processing fluid preferably extends on both sides of the separation line to seal both the trailing edge of the photograph and the leading edge of the separated trap.

The present invention is particularly directed to the relatively rigid transverse stiffening member or diverter bar 44 attached to the leading end of carrier sheet 24. The diverter bar is made of sheet metal that is folded along its leading edge 46 to provide a main portion that overlies and is permanently crimped to the leading edge of the carrier sheet and a pair of lateral end portions or tips 48 that project transversely beyond the lateral edges of the carrier sheet and the print card. Similar stiffening members or diverter bars and the various functions that they perform are disclosed in the above-cross-referenced U.S. patent application Ser. No. 268,940, incorporated herein by reference. The present invention provides such a diverter bar with spacer means which, in the illustrated preferred embodiment, comprise a pair of tabs or ears 50 that are die cut out of the sheet metal bar and initially are bent forward to project from the plane of the main portion of the bar. The exact configuration of the tabs or ears is not critical, but preferably they are located generally in alignment with the print card spacer rails 22 so that they are spaced laterally beyond the image area of the print card. As described hereinafter, the spacer means perform several important functions in enhancing the feedability of the successive film units from the cartridge to the pressure member nip and the manipulability and storability of the successive pod assemblies emerging from the nip, as well as reducing the criticality of certain tolerances.

A plurality of film units of the type described above are supplied in a cartridge or film pack 56, best illustrated in FIGS. 4–6. As mentioned above, specific structural details of the film pack are disclosed in greater detail in U.S. patent application Ser. No. 268,932. The box-like casing 58 of the film pack is made of plastic or sheet metal and includes a forwardly facing exposure opening or window 60 surrounded by a shallow recess 62 in the casing front wall 64. As best shown in FIG. 5, the film units 10 initially lie substantially flat in stacked relation to one another in a film unit compartment 66 within the casing. Each film unit thus lies substantially in a plane, with its print card disposed in alignment with exposure window 60. A pressure plate 68 is located behind the print cards of the film units in film unit compartment 66 and is biased forwardly by leaf springs 70 to compress the stack of film units against the casing front wall 64. A pod support spring 72 is carried by the pressure plate and resiliently urges the pod assemblies of the film units forwardly toward guide rails 74 carried by the casing front wall. The portion of the casing that houses the pod assemblies is sufficiently wide to accommodate their diverter bars, but the remainder of the casing conforms to the width of the print cards to maintain To achieve maximum compactness of the stored film unit compartment 66.

Initially, an opaque cover element 76 is located forwardly of the forwardmost film unit to protect that unit from ambient light. The cover element is substantially identical to the film units except that no pod is provided on its carrier sheet 78 and an opaque disposable card 80 is substituted for the print card and trap assembly of a film unit.

To achieve maximum compactness of the stored film units and to avoid crushing the pod assemblies thereof, the pods 28 are tapered, and the pod assemblies 14 and the cover element carrier sheet 78 initially assume a splayed arrangement, as illustrated in exaggerated form in FIG. 5. Because of the increased effective thickness afforded each diverter bar by the spacer tabs or ears 50, the bars maintain the pod assemblies in their splayed arrangement and thereby prevent the pods from being squeezed tightly together. The guide rails 74 carried by casing front wall 64 straddle the tabs or ears 50 so that the lateral end portions or tips 48 of the bar associated with the cover element or the film unit subsequently in exposure position are urged against positioning surface 84 of notches 86 in the guide rails. This arrangement aligns the diverter bar of the cover element or the exposable film unit with an exit slot 88 between casing front wall 64 and the forward edge 90 of casing end wall 92.

By reference to FIG. 6, it will be seen that guide rails 74 are joined to the side walls 94 of the wider portion of the cartridge or film pack casing by recessed walls 96, which terminate at notches 86. This construction provides the front surface of the film pack casing with slots 98, the bottom surfaces 100 of which are established by the corresponding recessed walls 96. As explained in detail in the aforementioned U.S. patent application Ser. No. 260,932, surfaces 100 are located in accurate predetermined relation to the diverter bar seated against positioning surfaces 84 of guide rails 74 so that a pair of feeder fingers, described below, can be positioned by surfaces 100 to engage the tips of that bar and deliver the bar properly through exit slot 88 and into the nip of the presssure members.

Behind the portion of the film pack initially containing the pods, the film pack casing extends beyond end wall 92 to provide a chute or porch 102. The rearward edge 104 of casing end wall 92 is spaced from the casing back wall 106 to provide an entrance opening 108 through which waste elements such as the exhausted pod assemblies of the film units can be inserted into storage compartment 110. Guide ramps 112 extend along the side walls 94 of the wider portion of the film pack casing and terminate at ribs 114 adjacent to the transition between the wider and narrower portions of the casing. The confronting internal surfaces of walls 94 are spaced apart slightly farther than the width of the film unit diverter bars, and the space between ramps 112 is narrower than the bars but wider than the carrier sheets so that the ramps engage only the lateral end portions or tips 48 of the bars. At the end of the chute or porch, retaining walls 116 extend toward each other from walls 94 and are spaced by a distance less than the width of the major or leading end portion of the carrier sheet but greater than the width of the minor or trailing end portion or tongue of the carrier sheet.

Figure 7:
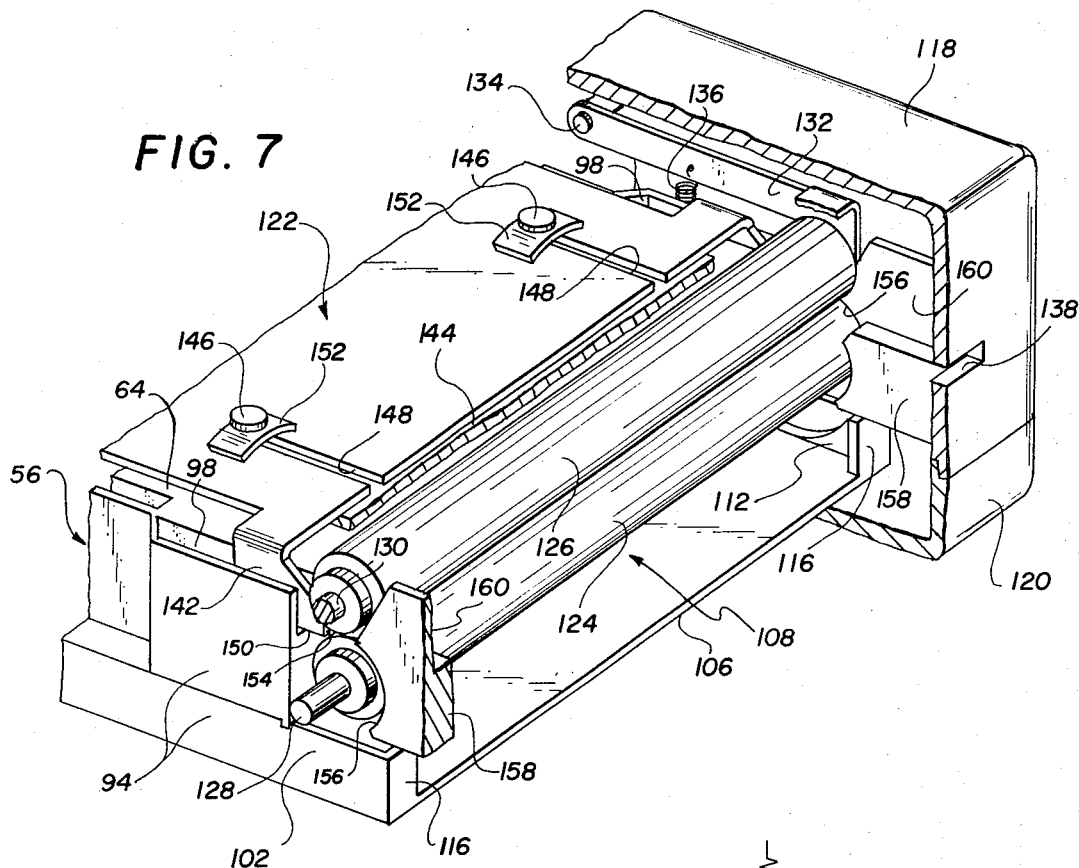
FIG. 7 is a fragmentary perspective view of the film pack shown in FIGS. 4–6, illustrating its relation to the principal elements of a film unit processing mechanism in a cooperating camera.

Referring now to FIG. 7, a camera adapted to use film pack 56 includes a housing 118 that is provided with a hinged cover door 120 which can be opened to permit insertion of the film pack into the housing. Within the housing, the camera contains a processing mechanism which includes a reciprocable feeder member or shuttle 122 and a pair of juxtaposed rotatable pressure members or rollers 124 and 126. The rearward roller 124 is rotatably supported in fixed relation to the camera housing by the reception of its end shafts 128 in corresponding bearing holes of appropriate support plates, not shown. The end shafts 130 of the forward roller are carried by a bracket 132, which is pivotally attached to the camera housing by pins 134. A pair of relatively strong springs 136 bias bracket 132 rearwardly to provide a firm but yieldable pressure at the roller nip, which is aligned with a slot 138 in the adjacent end wall of the camera housing. At one end of the rollers, their end shafts are provided with meshing spur gears, not shown, which cause the rollers to rotate in synchronism in opposite directions, as shown by arrows 140.

When the film pack is in its loaded position in the camera housing, illustrated in FIG. 7, it is resiliently urged into engagement with stationary support surfaces of the housing to locate the photosensitive surface of a film unit exposable through exposure window 60 in coincidence with the focal plane of the camera lens. Such location of the film pack within the camera housing also aligns the film pack exit slot 88 with the nip between the two pressure members and causes feeder fingers 142 of shuttle 122 to extend into slots 98 of the film pack.

The shuttle 122 is reciprocably mounted on a stationary support plate 144 by studs 146 extending through slots 148 in the shuttel. The rearward surfaces 150 of feeder fingers 142 are held in light resilient engagement with film pack slot surfaces 100 by the influence of relatively weak spring blades or washers 152 under the heads of studs 146. This resilient finger positioning feature is not essential to the operation of the processing mechanism, but it allows the fingers to be positioned by the film pack without compromising accurate location of the pack, thereby avoiding the dimensional tolerances that otherwise would be required to maintain the fingers in close proximity to surfaces 100 but not actually in contact with those surfaces.

Figure 8:
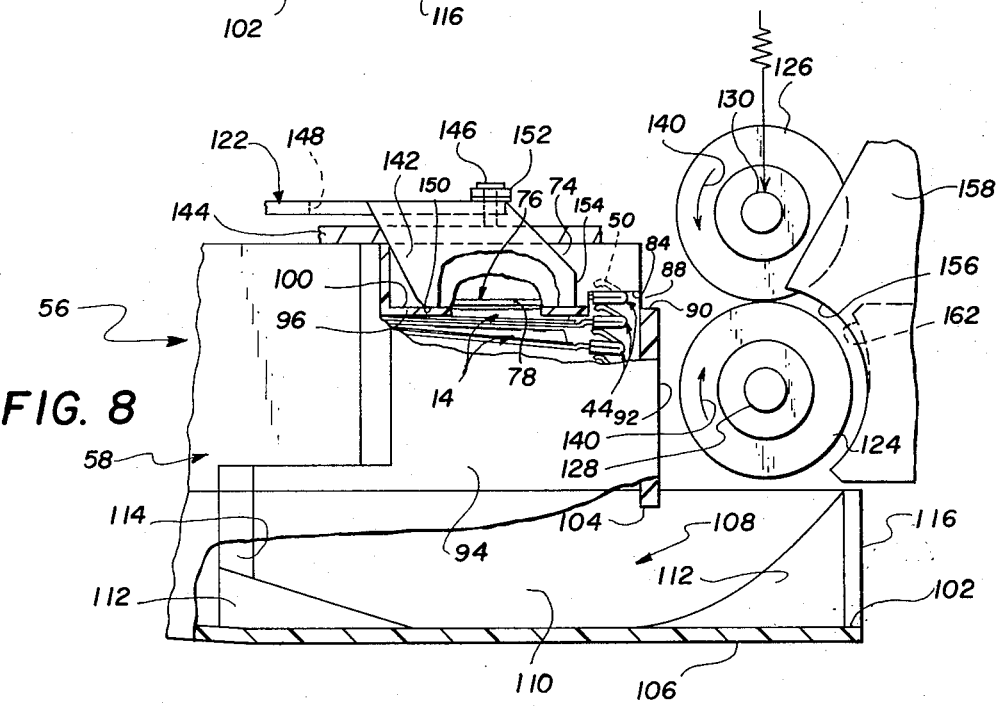
FIGS. 8–10 are partial side-elevational views corresponding generally to FIG. 7 but illustrating successive stages in the operation of the processing mechanism.
Figure 9:
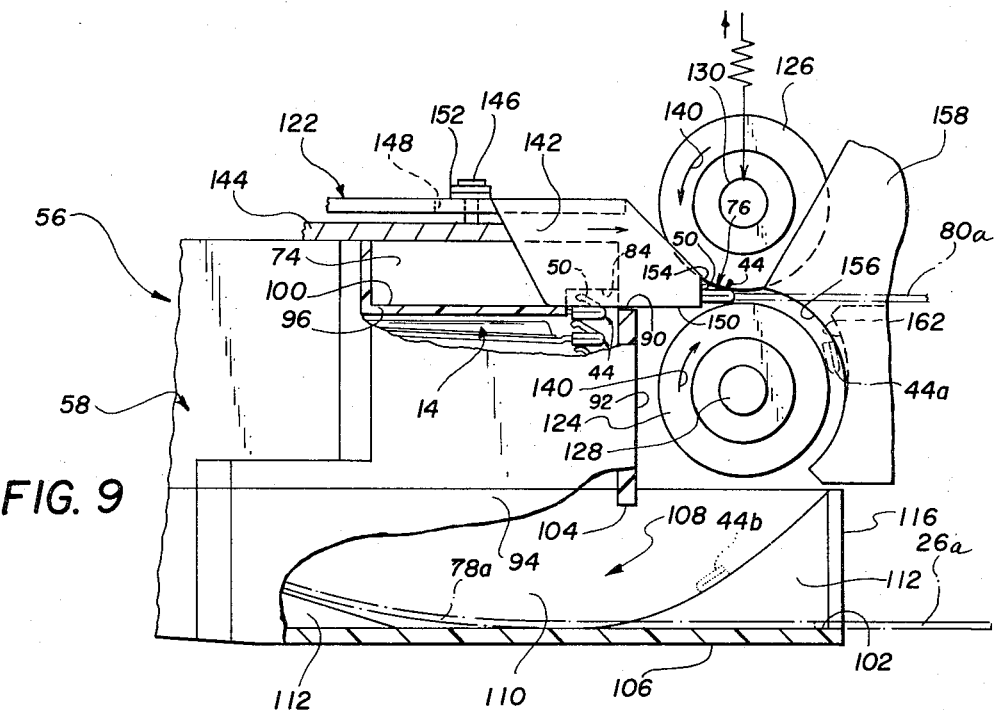
Figure 10:
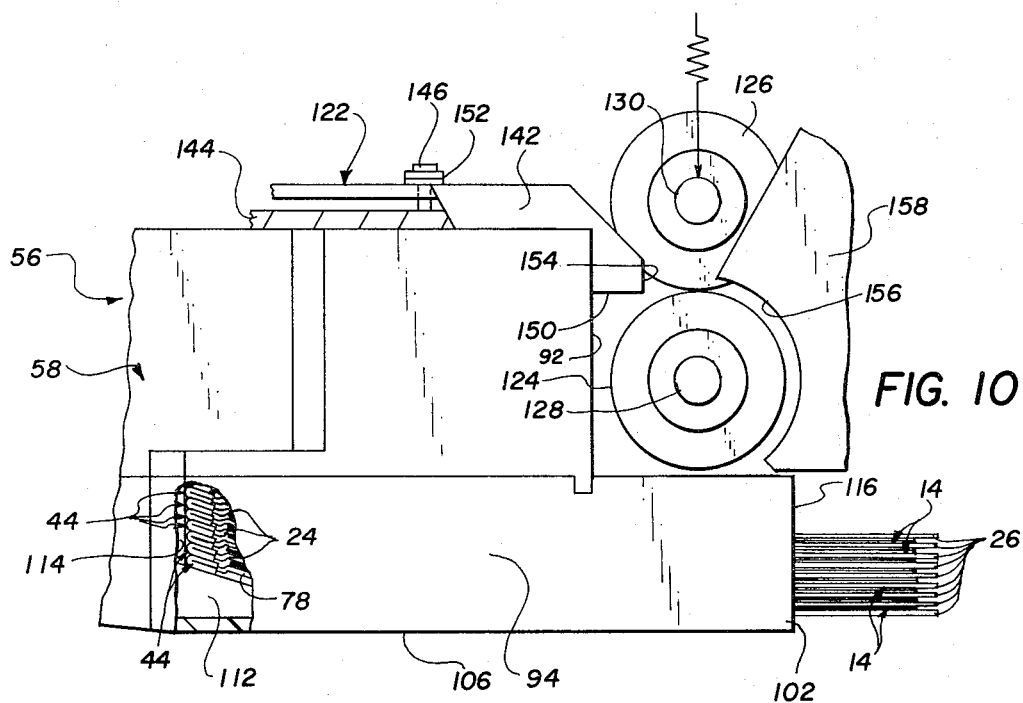

When the film pack is loaded into the camera, the shuttle is located in its initial or first position, shown in FIGS. 7, 9, and 10, whereby surfaces 150 of fingers 142 engage the tips of the cover element diverter bar 44 and displace that bar rearwardly out of contact with positioning surfaces 84 of guide rails 74 and out of alignment with exit slot 88. During each processing operation, the shuttle is moved momentarily to a retracted or second position, shown in FIG. 8, and is then returned to its initial position, while rollers 124 and 126 are rotating in the directions shown by arrows 140. The aforementioned U.S. patent application Ser. No. 268,948 discloses a processing mechanism adapted to rotate the pressure members and effect reciprocative movement of the shuttle. A description of such a mechanism has been omitted from this disclosure because details thereof are not believed necessary to an understanding of the present invention.

After the film pack has been loaded into the camera, movement of shuttel 122 to its retracted or second position displaces feeder fingers 142 beyond engagement with cover element diverter bar 44, as shown in FIG. 8, thereby allowing that bar to be urged into engagement with guide rail surfaces 84 and into alignment with exit slot 88 under the influence of pod support spring 72. The subsequent return movement of shuttle 122 to its initial position, illustrated in FIG. 9, causes the end surfaces 154 of fingers 142 to engage tips 48 of cover element diverter bar 44 and drive the bar through slot 88 and into the nip between pressure members 124 and 126. Because the tabs or ears 50 on the diverter bar of the forwardmost film unit are located inwardly of fingers 142, the fingers can extend rearwardly slightly beyond the cover element diverter bar, as shown in FIG. 8, thereby ensuring that the finger end surfaces 154 can positively engage the cover element diverter bar without encountering the adjacent diverter bar of the forwardmost film unit. It will thus be seen that the diverter bar tabs or ears can substantially reduce the tolerances that otherwise would have to be maintained to ensure engagement by the feeder fingers with only the forwardmost diverter bar if that bar and the adjacent bar were in intimate contact with each other throughout their entire lengths.

Figure 3:
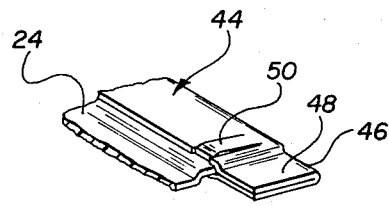
FIG. 3 corresponds to FIG. 2 but shows the spacer means in its collapsed or deformed condition.

As the cover element diverter bar enters the pressure member nip, it is driven through the nip by rotation of those members, and the tabs or ears on the bar are flattened by the nip pressure and become substantially flush with the adjacent bar surfaces, as shown in FIG. 3. Upon emerging from the nip, the tips of the bar engage the outer arcuate surfaces 156 of a pair of guide shoes 158 which are located adjacent to the corresponding ends of the pressure members, as best shown in FIG. 7. Guide shoes 158, which are disclosed in detail in the above-cross-referenced U.S. patent application Ser. No. 268,930, incorporated herein by reference, direct the bar rearwardly away from the substantially straight, planar movement path defined by cartridge slot 88, the pressure member nip, and camera slot 138, partially around roller 124, as indicated in broken lines by numeral 44a in FIG. 9, and then into engagement with guide ramps 112, which guide the bar through opening 108 and into storage compartment 110, as indicated in broken lines by numeral 44b in FIG. 9. As continued movement of the cover element brings the leading edge of its card 80 through the nip, the card passes between outer parts 160 of guide shoes 158, as indicated is broken lines by numeral 80a in FIG. 9, and the inherent stiffness of the card causes it to continue moving in substantially the same straight, planar movement path referred to above, so that its leading edge emerges from the camera housing through slot 138. The cooperation between the relatively flexible cover element carrier sheet 78 and inner guide surfaces 162 of guide shoes 158 causes the carrier sheet to be pulled free of the cover element card and to assume a storage position in compartment 110, as indicated in broken lines by numeral 78a in FIG. 9. In its storage position, the diverter bar abuts against ribs 114, and tongue 26 of carrier sheet 78 extends between retaining walls 116 of porch 102, as indicated in broken lines by numeral 26a in FIG. 9. During the separation of the carrier sheet from the card, the shuttle remains in its initial position and thereby maintains the diverter bar of the forwardmost film unit rearward of slot 88 to prevent endwise movement of that unit. Upon completion of the operating cycle, the pressure members stop rotating and the shuttle remains in its initial position until the next cycle is begun.

After the forwardmost film unit is exposed, activation of the processing mechanism causes the shuttle once again to move from its initial position to its retracted position in order to engage the diverter bar of the exposed unit after the bar has been urged forwardly by spring 72 into contact with positioning surfaces 84, whereupon the shuttle returns to its initial position and thereby moves the bar into the nip. Rotation of the pressure members then drives the exposed unit through the nip, causing its pod assembly to become separated from its print card in the manner described above. In the case of a film unit, however, the pressure members also rupture the pod and distribute the processing fluid between the superposed sheets of the print card, as previously described. Because the tabs or ears 50 of each diverter bar are located laterally or transversely beyond or outwardly of the image area of the print card, any scratching or abrading of the pressure member surfaces by those tabs or ears would be beyond the image area and therefore could not affect the quality of the photograph. As the diverter bar of each film unit enters the storage compartment 110, ramps 112 direct the bar into contact with the forward-facing surface of the preceding carrier sheet, and the bar slides along that surface into abutment with ribs 114. Because the tabs or ears of each diverter bar are flattened upon passing through the nip, each bar can slide easily over its predecessor as it reaches its storage position.

By repeating the same cycle of operation of the shuttle and pressure members after the exposure of each film unit, all of the film units become processed and their exhausted pod assemblies, comprising the processing waste elements, are delivered to the storage compartment in stacked relation to one another, thereby eliminating any need for the photographer to handle those elements. As shown in FIG. 10, the flattened condition of the diverter bar tabs or ears enables the pod assemblies to be stacked within storage compartment 110 in substantially less space than they initially occupied in film unit compartment 66. Because only the tongues of the carrier sheets can extend between retaining walls 116 at the end of porch 102, the tendency of those sheets to assume a flat condition prevents them from accidentally falling out or being withdrawn from the storage compartment.

The invention has been described in detail with particular reference to the preferred embodiment thereof, but it will be understood that variations and modifications can be effected within the spirit and scope of the invention.

What is claimed is:

1. In a self-processable film unit adapted to lie substantially flat in a pack of such units receivable by a cooperating camera, the pack including means defining an opening through which an exposure of each unit sequentially can be effected to record thereon a processable latent image and means defining a slot through which an endwise movement of each unit sequentially can be effected after the exposure, the camera including means for receiving the pack, means for effecting the exposure, means for effecting the endwise movement, and means defining a pressure nip through which each unit sequentially can pass during the endwise movement to initiate processing of the latent image, the film unit including:

(a) an image-recording section defining a plane and having a pair of lateral edge portions, a transverse edge portion interconnecting said lateral edge portions, and an image area intermediate said edge portions for recording the latent image; and (b) a processing section having a first end portion coupled to said image-recording section, a second end portion extending away from said transverse edge portion, and a pressure-rupturable pod containing a processing fluid in communication with said image area for supplying said fluid to said area upon passage of said processing section through the nip;

an improvement comprising:

(c) a transverse stiffening member coupled to said second end portion and having a surface substantially in said plane and means projecting from said plane for spacing said surface from an adjacent unit in the pack to facilitate the endwise movement, said spacing means being deformable to lie substantially in said plane upon passage of said member through the nip to render said member more compact for subsequent storage.

2. The film unit improvement claimed in claim 1 wherein said image-recording section includes a first element and a second element superposed upon said first element; and wherein said elements are permanently coupled to each other at said lateral edge portions and separable from each other at said transverse edge portion and said image area to permit supply of said fluid to said area between said elements.

3. The film unit improvement claimed in claim 2 wherein said processing section includes a carrier sheet having said first and second end portions and carrying said pod; and wherein said first end portion is separably coupled to said transverse edge portion and said pod is permanently coupled to said sheet between said first and second end portions to permit separation of said processing section from said image-recording section after the passage of said processing section through the nip.

4. The film unit improvement claimed in claim 3 wherein said carrier sheet is relatively flexible and said transverse stiffening member is relatively rigid; and wherein said stiffening member is permanently coupled to said second end portion and extends transversely beyond said lateral edge portions to facilitate diversion of said carrier sheet from said plane and the separation of said processing section from said image-recording section after the passage of said processing section through the nip.

5. The film unit improvement claimed in claim 4 wherein said transverse stiffening member includes a main portion overlying said second end portion and defining said surface and a pair of lateral end portions extending transversely from said main portion and beyond said carrier sheet; and wherein said spacing means includes a pair of tabs projecting from said surface and disposed adjacent to said lateral end portions respectively.

6. The film unit improvement claimed in claim 5 wherein said tabs are in endwise alignment with said lateral edge portions respectively.

7. In a film unit having a predetermined width and a leading end, the film unit being exposable in a camera having a pair of juxtaposed pressure members defining a nip therebetween and processable by movement of the film unit, leading end first, through the nip, the film unit lying substantially in a plane and including:

(a) a generally rectangular print card having leading and lateral edge portions and a generally rectangular, centrally disposed image portion adapted to record a latent image processable by a processing fluid to transform the latent image into a visible image;

(b) a processing fluid pod assembly having leading and lateral edge portions, the pod assembly being separably attached to the print card and extending beyond the leading edge portion of the card for supplying processing fluid to the image portion during the movement of the film unit, leading end first, through the nip; and (c) a relatively rigid diverter bar having opposite end portions and traversing the predetermined width of the film unit, the bar being permanently attached to the leading edge portion of the pod assembly and defining the leading end of the film unit;

an improvement comprising:

(d) spacer means carried by the diverter bar for establishing an initial effective thickness of the bar in a direction normal to the plane of the film unit, said spacer means being collapsible upon movement of the bar through the nip to render the bar thinner thereafter than said initial effective thickness.

8. The film unit improvement claimed in claim 7 wherein the diverter bar comprises an elongate strip of sheet metal folded longitudinally over the leading edge portion of the pod assembly; and wherein said spacer means includes a pair of ears integral with said strip and bent away from the plane of the film unit adjacent to the end portions of the bar.

9. The film unit improvement claimed in claim 8 wherein said ears are disposed in respective endwise alignment with the lateral edge portions of, and laterally beyond the image portion of, the print card.

10. The film unit improvement claimed in claim 9 wherein the end portions of the diverter bar extend laterally beyond said ears and beyond the lateral edge portions of the print card and the pod assembly.

References Cited
UNITED STATES PATENTS

| | | | |
|---|---|---|---|
| 3,636,845 | 1/1972 | Harvey | 96—76 C |
| 3,680,456 | 8/1972 | Nerwin | 96—76 C |
| 3,672,274 | 6/1972 | Ewald | 96—76 R |

RONALD H. SMITH, Primary Examiner

J. L. GOODROW, Assistant Examiner

U.S. Cl. X.R.

95—13

PO-1050
(5/69)

UNITED STATES PATENT OFFICE
CERTIFICATE OF CORRECTION

Patent No. 3,799,778          Dated March 26, 1974

Inventor(s) Henry J. Bartnick

It is certified that error appears in the above-identified patent and that said Letters Patent are hereby corrected as shown below:

In Col. 1, line 49, "typ" should read --type--. In Col. 3, line 53, "selfprocessable" should read --self-processable--. In Col. 4, line 63, "peramnently" should read --permanently--. In Col. 5, line 46, "To achieve maximum compactness of the stored" should not appear; Col. 5, line 45, after "maintain", --the film units in stacked alignment with one another in-- should appear. In Col. 6, line 65, "shuttel" should read --shuttle--. In Col. 7, line 21, "shuttel" should read --shuttle--; Col. 7, line 67, "is" should read --in--.

Signed and sealed this 17th day of September 1974.

(SEAL)
Attest:

McCOY M. GIBSON JR.        C. MARSHALL DANN
Attesting Officer         Commissioner of Patents